(12) United States Patent
Yi et al.

(10) Patent No.: US 8,879,451 B2
(45) Date of Patent: Nov. 4, 2014

(54) VEHICLE BATTERY POWER SAVE TIMER

(75) Inventors: Ki Hak Yi, Windsor (CA); Christopher N. Shamoun, Commerce Township, MI (US)

(73) Assignee: General Motors LLC, Detroit, MI (US)

(*) Notice: Subject to any disclaimer, the term of this patent is extended or adjusted under 35 U.S.C. 154(b) by 301 days.

(21) Appl. No.: 13/184,223

(22) Filed: Jul. 15, 2011

(65) Prior Publication Data
US 2013/0016637 A1 Jan. 17, 2013

(51) Int. Cl.
*H04B 1/38* (2006.01)
*G08C 17/00* (2006.01)
*B60R 25/40* (2013.01)

(52) U.S. Cl.
CPC .................................. *B60R 25/403* (2013.01)
USPC ....... 370/311; 455/343.2; 455/574; 340/7.32; 701/36

(58) Field of Classification Search
None
See application file for complete search history.

(56) References Cited

U.S. PATENT DOCUMENTS

| | | | | |
|---|---|---|---|---|
| 6,163,690 | A * | 12/2000 | Lilja | 455/574 |
| 2002/0115436 | A1* | 8/2002 | Howell et al. | 455/426 |
| 2003/0181169 | A1* | 9/2003 | Mutoh | 455/99 |
| 2003/0190030 | A1* | 10/2003 | Alton | 379/219 |
| 2004/0198466 | A1* | 10/2004 | Walby et al. | 455/574 |
| 2009/0029671 | A1* | 1/2009 | Cho et al. | 455/345 |
| 2009/0088910 | A1* | 4/2009 | Yi et al. | 701/1 |
| 2011/0127831 | A1* | 6/2011 | Skarani et al. | 307/10.7 |
| 2012/0149323 | A1* | 6/2012 | Springs et al. | 455/404.1 |
| 2012/0155636 | A1* | 6/2012 | Muthaiah | 380/44 |
| 2013/0078984 | A1* | 3/2013 | Luo et al. | 455/418 |

OTHER PUBLICATIONS

Open Mobile Alliance—Device Management Working Group homepage, 2012, http://technical.openmobilealliance.org/Technical/DM.aspx.*

* cited by examiner

*Primary Examiner* — Andrew Chriss
*Assistant Examiner* — Joshua A Kading
(74) *Attorney, Agent, or Firm* — Leydig, Voit & Mayer, Ltd.

(57) ABSTRACT

The described method and system provide for processing telematics service-related calls on a telematics-equipped vehicle when the vehicle ignition is off. By utilizing one or more call timers, the described invention is able to prevent excessive drain to the vehicle battery while still providing broad access to telematics services when the vehicle ignition is off. Certain types of calls may be excepted from the call timers, and different types of calls may use different call timers. A call center may also intervene and modify the process by changing the values of the timers.

18 Claims, 4 Drawing Sheets

VEHICLE BATTERY POWER SAVE TIMER

BACKGROUND OF THE INVENTION

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit can be utilized to provide a subscriber with the telematics services.

When the ignition of the mobile vehicle is off, vehicle hardware, such as the telematics unit, may be placed into a standby state or DRx (Discontinuous Receive) mode to minimize power drain on the vehicle battery. Often, a subscriber still wishes to use a variety of services provided by the vehicle even when the ignition is off (e.g. hands-free calling, GPS navigation, emergency calling, theft reporting, etc.), which may cause an excessive drain on the vehicle battery. This may lead to the battery running out of power and the vehicle ignition being subsequently unable to start the engine.

Further excessive drain can be cause by abnormal hung-up call states due to the complexity of processing multiple call types and multiple call durations. These hung-up states may be missing state in the network or in the network access device in the telematics unit. With the increase in wireless technologies that are added into the network access device in the telematics unit such as CDMA2000 1XRTT/EVDO, GSM/GPRS/EDGE, WCDMA/HSPA and LTE, the probability of missing call control can occur.

Thus, it is an object in part to provide a system and method for limiting excessive drain on the vehicle battery while maintaining as much functionality to the subscriber as possible when the vehicle ignition is off. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for limiting the drain on a vehicle battery while the ignition is off while maintaining provision of a broad array of telematics services to a subscriber. In one implementation, the method includes: determining, at the telematics unit that the vehicle ignition has been turned off; determining whether a call is ongoing when the vehicle ignition is turned off; and if the telematics unit determines that a call is ongoing, remaining in an ON mode and continuing to carry out the call, incrementing a call timer if the ongoing call continues for an increment of time, determining whether the call timer has expired; and terminating the call if the call time is determined to have expired; but if the telematics unit determines that a call is not ongoing, transitioning to a discontinuous receive (DRx) mode if the telematics unit determines that a call is not ongoing. Furthermore, the telematics unit may determine whether the ongoing call is an excepted call, and, if so, the call timer will not be incremented while the telematics unit is carrying out that call. The determination may be made by checking whether the ongoing call is included in a list of excepted call types (e.g. emergency, anti-theft, "blue button," etc.). Determining that the vehicle ignition has been turned on causes the call timer to reset. Call requests may be processed in a similar manner.

A DSMT (Digital Sleep Mode Time-out) timer may control the DRx cycle of the telematics unit. When the telematics unit is in DRx mode, the DSMT timer may be incremented and the telematics unit may determine whether the DSMT timer has expired, and when the DSMT expires, the telematics unit may transition into an OFF mode. In a further implementation, different call timers with different expirations may be used for different types of calls, such as using a first call timer for OMA-DM (Open Mobile Alliance Device Management) calls and a second call timer for non-OMA-DM calls. In yet another further implementation, a call center may reconfigure the values of the timers and the list of excepted call types. It will be appreciated that the processes described may also be implemented as computer-executable instructions on a computer-readable medium stored at a telematics unit and executed at the telematics unit.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for processing telematics service-related calls on a telematics-equipped vehicle when the vehicle ignition is off. By utilizing one or more call timers, the described invention is able to prevent excessive drain to the vehicle battery while still providing broad access to telematics services when the vehicle ignition is off.

For simplicity, two vehicle ignition states are referenced herein: when the vehicle ignition is on (IGN-ON) and when the vehicle ignition is off (IGN-OFF). It will be appreciated that the IGN-ON and IGN-OFF states may actually include other states such as when the ignition key switch is in an "Accessory Mode" or "Crank-In" mode instead of simply being on or off. As used herein, the IGN-OFF mode simply means the vehicle ignition is off, and IGN-ON means any ignition mode other than the IGN-OFF mode. It will be appreciated that this is not a limitation, and that other associations made be used (e.g. IGN-ON including RUN and CRANK modes with ION-OFF including ACCESSORY and OFF modes).

Three telematics unit states, distinct from the two vehicle ignition states, are also referenced herein: the telematics unit may be in an ON mode (where it is capable of conducting service-related calls), it may be in a DRx (Discontinuous Receive) mode (i.e. a type of standby mode where the telematics unit "wakes up" periodically to check for requests or instructions; DRx mode draws relatively less current than in the ON mode), or it may be in an OFF mode (where the telematics unit is simply off and inaccessible until the vehicle is turned on). The telematics unit generally enters the DRx mode after the vehicle ignition is turned off (unless a call is in progress as described below). When the telematics unit is in DRx mode and it receives a service request, it may switch the telematics unit to the ON mode to carry out the request. Upon completion of the task, the telematics unit may return to DRx mode. The length of time that the telematics unit stays in DRx mode may be controlled by a DSMT (Digital Sleep Mode Time-out) Timer, which is reset whenever the vehicle ignition is turned on. If the DSMT timer expires, the telematics unit may enter the OFF mode and become inaccessible for service.

Figure 1:
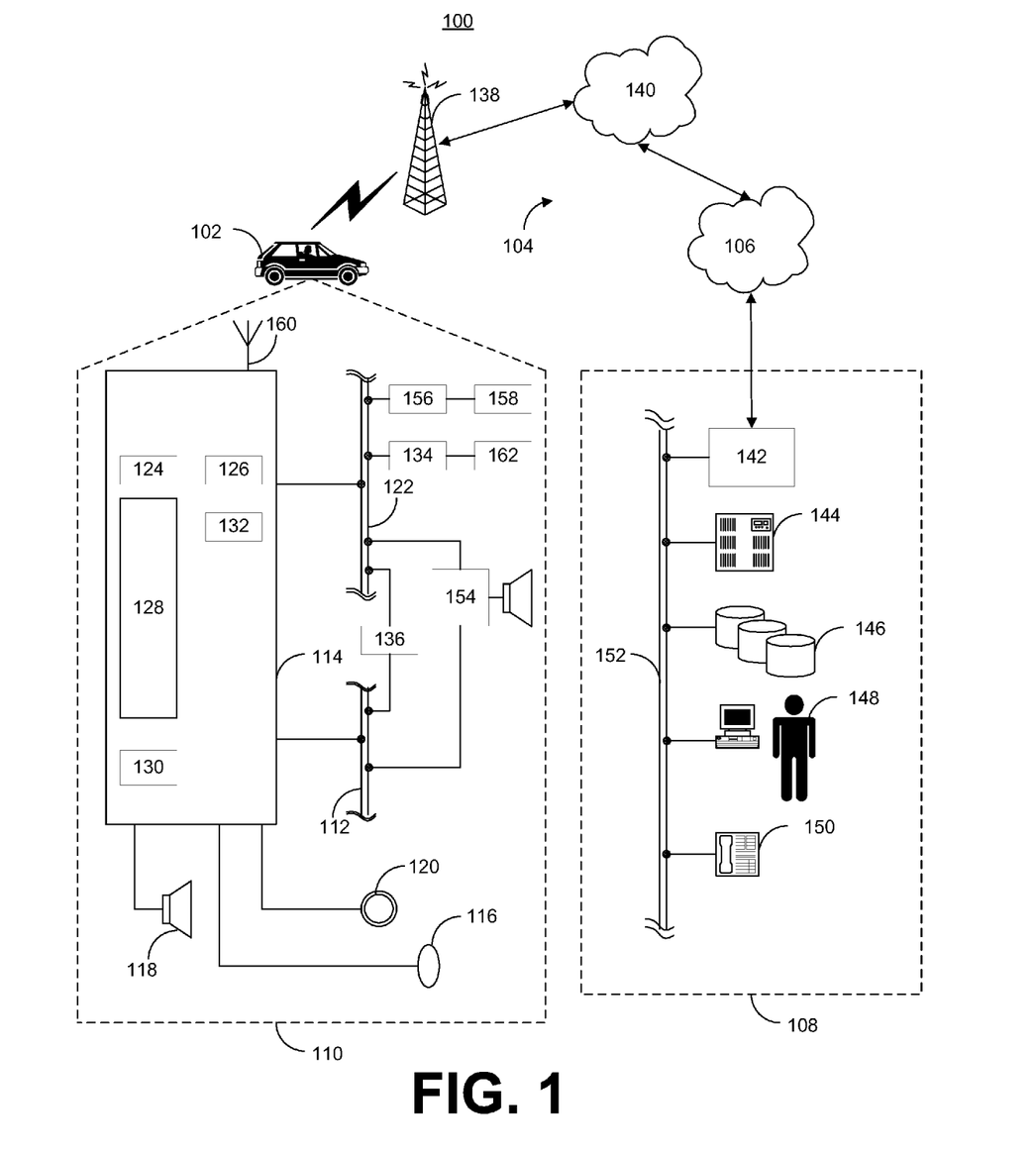
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface

156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
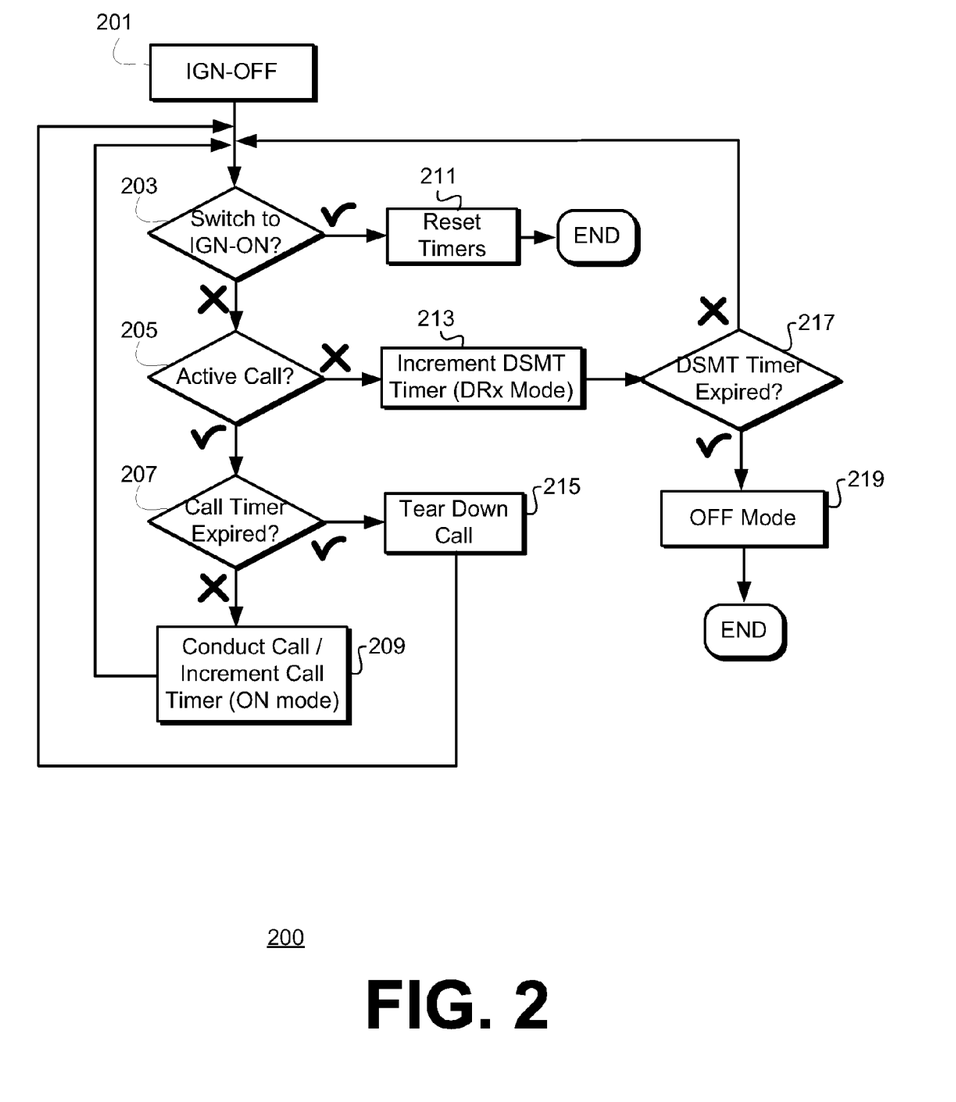
FIG. 2 is a flowchart illustrating a process for saving battery power using a call timer while the vehicle ignition is off in accordance with an implementation of the described principles.

With further reference to the architecture of FIG. 1, and turning more specifically to FIG. 2, a process 200 for saving battery power using a call timer while the vehicle ignition is off. The pre-condition for initiating this battery-saving process is the vehicle ignition being put into the IGN-OFF state 201. If a user of the telematics unit was on a call or initiated a telematics service request before the vehicle ignition was switched into the IGN-OFF state, the telematics unit may determine that an active call is ongoing 205 and keep the telematics unit in the ON state, allowing the call to continue while incrementing a call timer 209 (note that in this situation the call timer should not be expired yet 207 since the vehicle ignition was just put into the IGN-OFF state 201). If the telematics unit was not involved in a call-in-progress when the vehicle ignition was put into the IGN-OFF state 201, the telematics unit may enter the DRx mode and increment the DSMT timer 213. The DSMT timer may continue to be incremented so long as the vehicle is in DRx mode 213 and the DSMT timer is not determined to have expired 217. When the telematics unit does determine that the DSMT timer has expired 217, the telematics unit will enter the OFF mode 219, which will put an end to the battery-saving process 200. The telematics unit in the OFF mode will remain in the OFF mode until the vehicle ignition is put into the IGN-ON mode. It will be appreciated that the DSMT timer may increment more slowly or have a higher expiration than the call timer, as the length of time that the telematics unit may stay in DRx mode should be longer than the amount of time that the telematics unit can actively carry out a service call while in the ON mode without depleting the battery when the vehicle ignition is off.

If a telematics service request is received 205 (the "Active Call" box in FIGS. 2-4 can mean that the call is ongoing or a call request is received) while the vehicle is in the IGN-OFF state and the telematics unit is in the DRx mode, the telematics unit may check whether the call timer has expired 207. If it has already expired, the telematics unit may prohibit the call request from being processed 215 (the "Tear Down Call" box in FIGS. 2-4 can mean that a call request is not carried out or is terminated by the telematics unit). Because the call request was prohibited, the telematics unit may then determine that there is no active call 205 and stay in or re-enter DRx mode 213. If the call timer had not expired when the call request was received 207, the telematics unit may carry out the call and increment the call timer 209. If incrementing the call timer causes the call timer to reach its expiration while the user is on the call, the telematics unit may subsequently determine that the call timer has expired 207 and terminate the call 215.

If the vehicle ignition is switched to the IGN-ON state at any point throughout the process 200 described above, the call timer and DSMT timer will be reset 211 and the battery-saving process 200 is ended (since the vehicle ignition is no longer off). It will be appreciated that although switching the ignition to the IGN-ON state is depicted as a box 203 in FIG. 2, this depiction is merely for the convenience of the reader in illustrating the control logic during the battery-saving process 200. One of skill in the art will understand that the telematics unit need not "check" whether the vehicle ignition is switched on at the discrete points in the flowchart (although it may be optionally implemented that way), but rather the switching of the vehicle ignition to the IGN-ON state may interrupt this battery-saving process, reset the timers, and set the telematics unit to the ON state (without disrupting any call that was in progress when the vehicle ignition was switched to the IGN-ON state).

Figure 3:
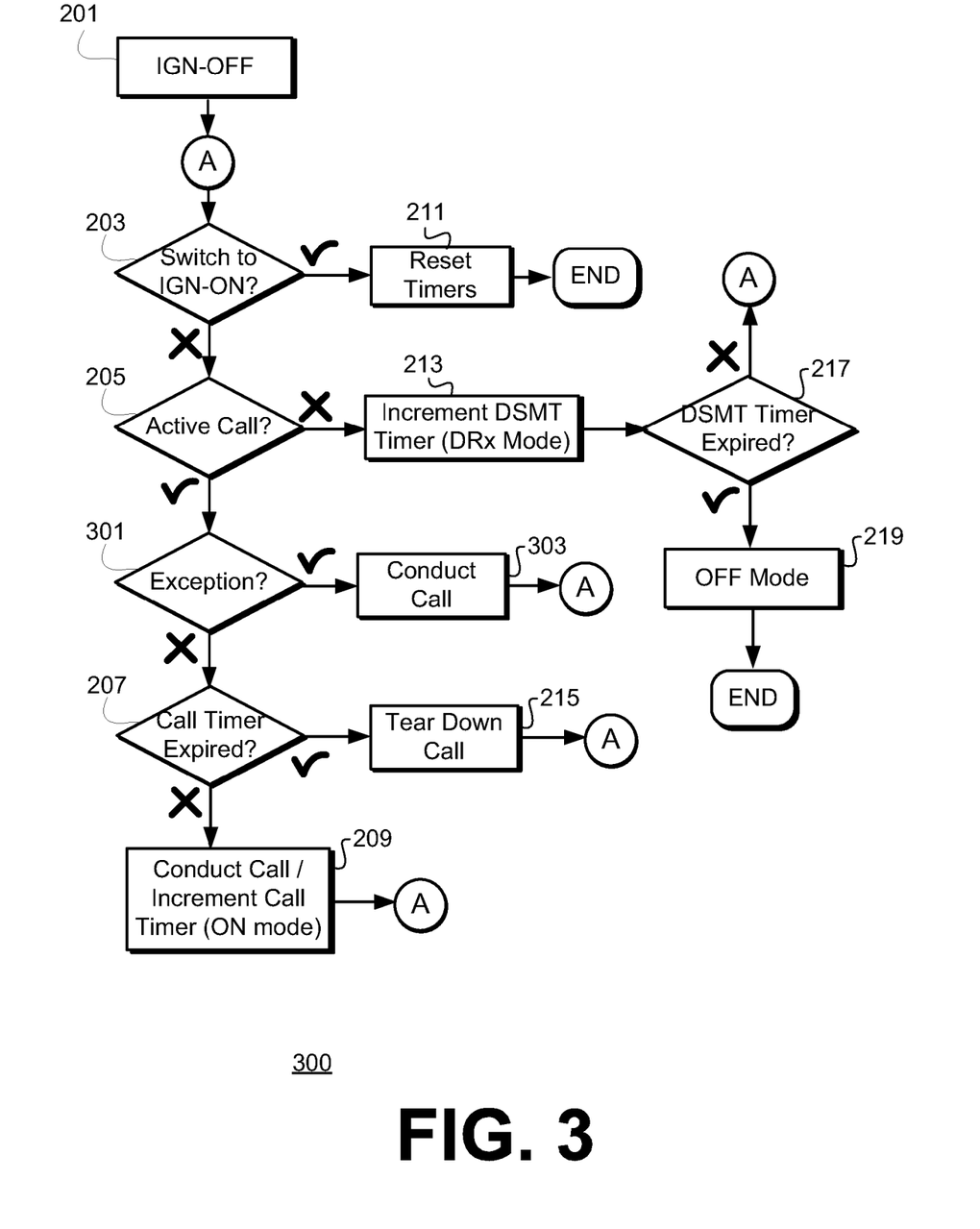
FIG. 3 is a flowchart illustrating a process for saving battery power using a call timer with exceptions for certain types of calls while the vehicle ignition is off in accordance with a further implementation of the described principles.

In a further implementation, certain types of service calls may be excepted from the call timer such that those calls will be performed by the telematics unit regardless of whether the call timer has expired and will not cause the call timer to increment. FIG. 3 depicts another process 300 for saving battery power using a call timer while the vehicle ignition is off incorporating certain exceptions (a reference point, node A, has been added to the flowchart for clarity of depiction). The process is similar to the process depicted by FIG. 2, except that after the telematics unit determines that an active call is ongoing or a call request has been received 205, it checks whether the active call or call request is a type of call that is excepted from the call timer 301. If it is excepted 301, the call is carried out by the telematics unit without incrementing the call timer 303. If it is not excepted, the processing of the call follows the same procedure as with FIG. 2 (the telematics unit checks whether the call timer has expired 207 and, if not, carries out the call and increments the call timer 209).

The types of calls that are excepted may be predetermined and stored in a list at the telematics unit. Generally, only the most important services would be included in such a list. For example, calls that may be excepted may include AACN (Advanced Automatic Crash Notification) calls, any emergency calls, "blue button" calls (i.e. non-emergency requests for assistance to the call center such as a situation where the user locks his or her keys inside the vehicle), and theft-related calls. The list may be configured and re-configured at any time by a diagnostic tool (e.g. an Assembly Line Diagnostic Link (ALDL)) or over a network through messages transmitted from the call center (e.g. AIF (Application Integration Framework), SMS (Short Message Service), or WSDL (Web Service Definition Language) messages).

In yet another further implementation, more than one call timer may be used, and the call timers may correspond to different calling protocols. This may be particularly useful where different calling protocols consume different amount of power. In the process 400 depicted by FIG. 4, one call timer, BPST3 (Battery Power Save Timer), is used to limit the amount of time used for OMA-DM (Open Mobile Alliance Device Management protocol) packet switched calls, and a different call timer, BPST1 is used for all other calls, including circuit calls and non-OMA-DM packet calls. Another feature included in this implementation is having the telematics unit determine whether each timer is available (i.e. the timer has a valid value) and providing a set value at which the timer may be turned off. In this example, valid ranges for BPST1 and BPST3 values may be 0 to 255 and if the value of BPST1 or BPST3 is outside of that range (or null), the telematics unit may not carry out service calls using the tinier that is out of range (or null). Furthermore, in this example, the set value may be zero such that if the value of BPST1 or BPST3 is set to zero (e.g. by a diagnostic tool or by the call center), the telematics unit will carry out service calls without incrementing the timer.

Figure 4:
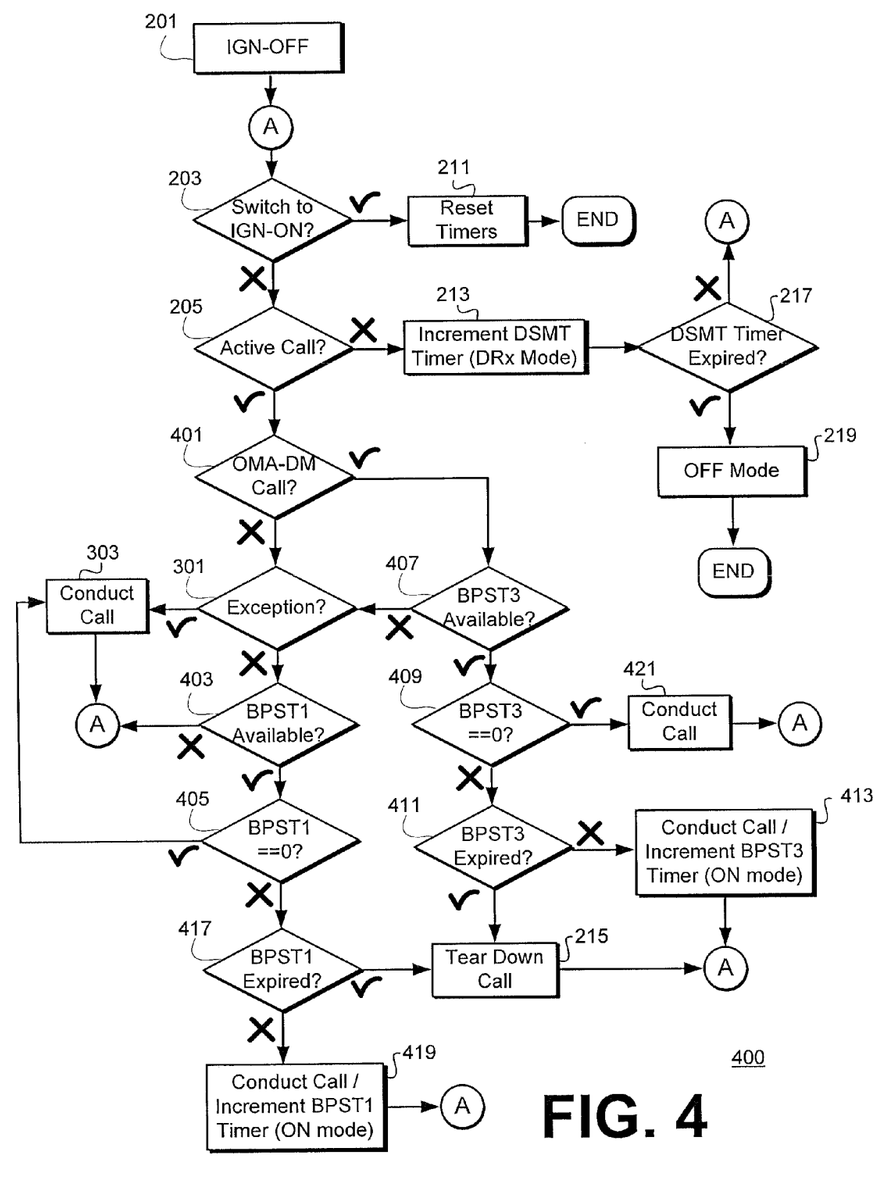
FIG. 4 is a flowchart illustrating a process for saving battery power using multiple call timers for different types of calls as well as exceptions for certain types of calls while the vehicle ignition is off in accordance with yet another further implementation of the described principles.

The process 400 may be better understood in the context of specific examples. First consider a situation where the values of BPST1 and BPST3 start at 1 with expiration values of 40 and the vehicle ignition is switched off while an OMA-DM call is in progress. The telematics unit would determine that an active call is ongoing 205, determine that the active call is an OMA-DM call 401, and determine whether BPST3 is available 407. Because BPST3 starts at 1, which is within the valid range of 0-255, the telematics unit determines that BPST3 is available 407, not equal to zero 409, and not expired 411. The telematics unit then continues servicing the call 421 and increments BPST3 after one time increment has passed (e.g. 1 minute) 413. The process 400 then returns to node A where the incrementing of BPST3 is repeated until the BPST3 timer expires or the user ends the call such that no active call is ongoing 205. For example, if the BPST3 timer reaches 40, the expiration value, the telematics unit will determine that a call is ongoing 205, it is a OMA-DM call 401, that BPST3 is available 407, that BPST3 is not equal to zero 409, that BPST3 has expired 411, terminate the call 215, return to node A, determine that there is no active call in progress 205, and enter DRx mode 213 and increment the DSMT timer after an appropriate amount of time has passed.

Second, consider a situation where the values of BPST1 and BPST3 start at 1 with expiration values of 40 and the vehicle ignition is switched off while a non-OMA-DM call is in progress. The telematics unit will determine that an active call is ongoing 205, determine that the active call is not an OMA-DM call 401, and determine whether the call is excepted or not 301 as described above with respect to FIG. 3. Assuming that the call is not excepted, the telematics unit determines that BPST1 is available 403 that BPST1 is not equal to zero 405, that BPST1 has not expired 417, and carry out the call and increment BPST1 after one time increment has passed 419.

Third, consider a situation where the value of BPST1 starts at 1 and BPST3 is null, and the vehicle ignition is switched off while an OMA-DM call is in progress. The telematics unit determines that a call is in progress 205, that it is an OMA-DM call 401, but that BPST is not available 407, and then determines whether the call is excepted or not 301. Assuming the call is not excepted, the OMA-DM call is processed under BPST1 as if it was a non-OMA-DM call. Thus, it will be appreciated that when BPST3 is null, all non-excepted calls, whether OMA-DM or not, are serviced under BPST1.

Fourth, consider a situation where the ignition has been in the IGN-OFF state for some time, and both BPST1 and BPST3 have previously been incremented to 40 and both have expiration values of 40. Assuming the user attempts a non-OMA-DM excepted call, the telematics unit will determine that a call is being attempted 205 that it is excepted 301, and thus the call will be carried out 303 regardless of the BPST1 and BPST3 timers. Assuming the user attempts a non-excepted call, the telematics unit will determine that a call is being attempted 205, that it is not excepted 301, that BPST1 is available 403, that BPST1 does not equal zero 405, that BPST1 has expired 417, and will terminate the call request 215 (leading to a determination that there is no active call 205 and causing the telematics unit to enter DRx mode 213).

It will be appreciated that in the implementation depicted by FIG. 4, if BPST3 has expired during an IGN-OFF cycle, the telematics unit will not serve any more OMA-DM calls regardless of whether BPST1 has expired. However, one skilled in the art could modify the programming such that BPST3 reaching the expiration value will cause the BPST3 to be "unavailable" at step 407, such that a call may be continued (or a new call request received and carried out) under BPST1 (similar to the situation described above where BPST3 is null).

Similarly, if it is desired that certain OMA-DM calls (e.g. emergency calls, anti-theft calls, etc.) are to be excepted from BPST3, an additional exception checking step may be added to the process 400 depicted by FIG. 4 between steps 401 and 407. In the implementation depicted by FIG. 4, the telematics unit only performs exception checking for OMA-DM calls if BPST3 is unavailable.

As mentioned above, a call center may monitor and configure the exception lists and timer values. One skilled in the art will appreciate that providing the call center with such flexibility has a broad variety of uses, particularly where the vehicle battery is more or less depleted than accounted for by the pre-programmed timer expiration values. For example, if the user makes several excepted calls and the battery is depleting ahead of schedule, the call center may send new BPST1 and BPST3 values to the telematics unit to account for the depletion rate (e.g. by setting both to be expired such that non-excepted calls cannot be made). In another example, if the battery has more charge than expected, or if the call center wishes to completely exempt OMA-DM calls for some reason, the call center may set BPST3 to the set value of zero such that the BPST3 timer is not incremented when OMA-DM calls are carried out. In yet another example, the battery may have been severely depleted during one ignition off cycle, and the user turns the ignition on only briefly before turning the vehicle ignition off again. This would cause all the timers to reset while in reality the battery is still severely depleted. The call center could intervene in this situation and set both BPST1 and BPST3 to be expired and/or set the DSMT timer to be at or near expiration. The call center may further base the timer values that it sends to the telematics unit on the amount of charge left in the vehicle battery.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center. It will further be appreciated that variables such as the call timers (e.g. BPST1 and BPST3) and DSMT timer may be stored in memory at the telematics unit and/or the call center.

It will be appreciated that the described system and method allows limitation of the drain on a vehicle battery while the ignition is off while maintaining provision of a broad array of telematics services to a subscriber. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for processing calls at a telematics unit on a telematics-equipped vehicle, the method comprising:
   determining, at the telematics unit, that an ongoing call is active when vehicle ignition is switched to an off state;
   determining that the ongoing call is not a call that is excepted from a call timer;
   activating the call timer in response to determining that the ongoing call is not excepted;
   operating the call timer to measure an elapsed time during the ongoing call and while the vehicle ignition is in the off state; and
   determining, based upon the elapsed time measured by the call timer, that the call timer has reached an expiration and, in response to the expiration, the telematics unit terminating the ongoing call and transitioning into a discontinuous receive (DRx) mode.

2. The method of claim 1, further comprising:
   resetting the call timer when the vehicle ignition is switched to an on state.

3. The method of claim 2, wherein, after the call timer has reached the expiration, the telematics unit does not allow further non-excepted calls to be made via the telematics unit until the call timer is reset.

4. The method of claim 1, further comprising:
   activating a digital sleep mode time-out (DSMT) timer in response to transitioning the telematics unit into the DRx mode;
   operating the DSMT timer while the telematics unit is in the DRx mode; and
   determining that the DSMT timer has reached an expiration and transitioning the telematics unit into an off mode in response thereto.

5. The method of claim 4, further comprising:
   resetting the DSMT timer when the vehicle ignition is switched to an on state.

6. The method of claim 1, wherein determining that the ongoing call is not a call that is excepted from a call timer comprises determining that the ongoing call is not an emergency call.

7. A non-transitory computer-readable medium having processor-executable instructions stored thereon for processing calls at a telematics unit on a telematics-equipped vehicle, the processor-executable instructions, when executed by a processor, causing the following to be performed:
   determining that an ongoing call is active when vehicle ignition is switched to an off state;
   determining that the ongoing call is not a call that is excepted from a call timer;
   activating the call timer in response to determining that the ongoing call is not excepted;

operating the call timer to measure an elapsed time during the ongoing call and while the vehicle ignition is in the off state; and determining, based upon the elapsed time measured by the call timer, that the call timer has reached an expiration and, in response to the expiration, the telematics unit terminating the ongoing call and transitioning into a discontinuous receive (DRx) mode.

8. The non-transitory computer-readable medium of claim 7, wherein the processor-executable instructions further cause the following to be performed:

resetting the call timer when the vehicle ignition is switched to an on state.

9. The non-transitory computer-readable medium of claim 8, wherein, after the call timer has reached the expiration, the telematics unit does not allow further non-excepted calls to be made via the telematics unit until the call timer is reset.

10. The non-transitory computer-readable medium of claim 7, wherein the processor-executable instructions further cause the following to be performed:

activating a digital sleep mode time-out (DSMT) timer in response to transitioning the telematics unit into the DRx mode;

operating the DSMT timer while the telematics unit is in the DRx mode; and determining that the DSMT timer has reached an expiration and transitioning the telematics unit into an off mode in response thereto.

11. The non-transitory computer-readable medium of claim 10, wherein the processor-executable instructions further cause the following to be performed:

resetting the DSMT timer when the vehicle ignition is switched to an on state.

12. The non-transitory computer-readable medium of claim 7, wherein determining that the ongoing call is not a call that is excepted from a call timer comprises determining that the ongoing call is not an emergency call.

13. A method for processing calls at a telematics unit on a telematics-equipped vehicle, the method comprising:

facilitating, at the telematics unit, a first call while vehicle ignition is in an off state;

determining that the first call is of a first call type;

operating a first call timer associated with the first call type to measure a first elapsed time while the first call is ongoing;

facilitating, at the telematics unit, a second call while the vehicle ignition is in the off state;

determining that the second call is of a second call type, wherein the second call type has a calling protocol that consumes more power than a calling protocol of the first call type;

operating a second call timer associated with the second call type to measure a second elapsed time while the second call is ongoing; and determining, based upon the elapsed time measured by the second call timer, that the second call timer has reached an expiration and, in response to the expiration, the telematics unit terminating the second call and transitioning into a discontinuous receive (DRx) mode.

14. The method of claim 13, further comprising:

determining that the first call timer has reached an expiration and, in response thereto, incrementing the second call timer while the first call is ongoing; and terminating the first call in response to determining that both the first and second call timers have reached expiration.

15. The method of claim 14, wherein the first call type are packet-switched call types and the second call type are non-packet-switched call types.

16. The method of claim 13, further comprising:

resetting the first and second call timers when the vehicle ignition is switched to an on state.

17. The method of claim 13, further comprising:

determining that the first call is not a call that is excepted from call timers; and determining that the second call is not a call that is excepted from call timers.

18. The method of claim 17, wherein determining that the first call is not a call that is excepted from call timers comprises determining that the first call is not an emergency call, and wherein determining that the second call is not a call that is excepted from call timers comprises determining that the second call is not an emergency call.

\* \* \* \* \*